(12) United States Patent
Pan et al.

(10) Patent No.: US 10,928,264 B2
(45) Date of Patent: Feb. 23, 2021

(54) SENSOR ASSEMBLY AND LIQUID LEVEL DETECTION DEVICE

(71) Applicant: Tyco Electronics (Shanghai) Co. Ltd., Shanghai (CN)

(72) Inventors: Lei Pan, Shanghai (CN); Pai Rajendra, Shanghai (CN); Tongbao Ding, Shanghai (CN); Weiguo Li, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 206 days.

(21) Appl. No.: 15/695,452

(22) Filed: Sep. 5, 2017

(65) Prior Publication Data
US 2018/0066973 A1    Mar. 8, 2018

(30) Foreign Application Priority Data
Sep. 5, 2016 (CN) .......................... 201621037810.5

(51) Int. Cl.
*G01L 19/14* (2006.01)
*G01L 19/00* (2006.01)
*G01F 23/18* (2006.01)

(52) U.S. Cl.
CPC ............ *G01L 19/143* (2013.01); *G01F 23/18* (2013.01); *G01L 19/0038* (2013.01); *G01L 19/0084* (2013.01)

(58) Field of Classification Search
CPC ........ G01F 23/18; G01F 23/185; G01F 23/14; G01L 19/003; G01L 19/0038; G01L 19/142; G01L 19/143; G01L 19/144; G01L 19/147; G01L 19/0084; G01L 19/14
See application file for complete search history.

(56) References Cited

U.S. PATENT DOCUMENTS

| 5,317,920 A | * | 6/1994 | Kremidas | ............. G01L 9/0051 338/4 |
| 5,410,916 A | * | 5/1995 | Cook | .................. G01L 19/0038 600/561 |
| 10,183,859 B2 | * | 1/2019 | Kosberg | .................. B81B 7/008 |

FOREIGN PATENT DOCUMENTS

| GB | 2236332 A | 4/1991 |
| JP | 01227018 | 9/1989 |
| KR | 20120139039 | 12/2012 |
| KR | 101447195 | 10/2014 |
| KR | 20150094023 | 8/2015 |

OTHER PUBLICATIONS

Abstract of KR20150094023, dated Aug. 19, 2015, 1 page.
Abstract of KR20120139039, dated Dec. 27, 2012, 1 page.
Abstract of KR101447195, dated Oct. 6, 2014, 1 page.
Abstract of JP01227018, dated Sep. 11, 1989, 1 page.

* cited by examiner

*Primary Examiner* — Justin N Olamit
(74) *Attorney, Agent, or Firm* — Barley Snyder (57) ABSTRACT

A sensor assembly comprises a housing, a pressure interface, a piezoelectric sensor, a mechanical interface, and an electrical interface. The pressure interface is disposed on the housing and communicates with a pressure transmission tube. The piezoelectric sensor is disposed in the housing and senses a pressure input at the pressure interface. The mechanical interface is disposed at a first side of the housing and detachably engages a mounting mechanism. The electrical interface is disposed at a second side of the housing opposite to the first side.

20 Claims, 7 Drawing Sheets

SENSOR ASSEMBLY AND LIQUID LEVEL DETECTION DEVICE

CROSS-REFERENCE TO RELATED APPLICATION

This application claims the benefit of the filing date under 35 U.S.C. § 119(a)-(d) of Chinese Patent Application No. 201621037810.5, filed on Sep. 5, 2016.

FIELD OF THE INVENTION

The present invention relates to a sensor assembly and, more particularly, to a sensor assembly of a liquid level detection device.

BACKGROUND

Known liquid level sensors are used to measure the level of a liquid in a piece of equipment, such as a washing machine. Hydraulic pressure in the equipment dictated by the liquid level is converted to a gas pressure by an air chamber and a pressure transmitting tube communicating with the air chamber. Variation in the gas pressure is transmitted to a pressure sensor by the pressure transmitting tube. The pressure sensor generates a variable electrical signal on the basis of the input pressure to reflect the liquid level.

In the prior art, once the pressure sensor is mounted, it is inconvenient to disassemble the pressure sensor to maintain or replace the sensor. Moreover, installation of the pressure sensor in the equipment is difficult, and the installed pressure sensor may move during operation of the equipment.

SUMMARY

A sensor assembly according to the invention comprises a housing, a pressure interface, a piezoelectric sensor, a mechanical interface, and an electrical interface. The pressure interface is disposed on the housing and communicates with a pressure transmission tube. The piezoelectric sensor is disposed in the housing and senses a pressure input at the pressure interface. The mechanical interface is disposed at a first side of the housing and detachably engages a mounting mechanism. The electrical interface is disposed at a second side of the housing opposite to the first side.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A liquid level detection device according to the invention is shown in FIGS. 1-7. The liquid level detection device includes a sensor assembly 100 and a mounting mechanism 200 for mounting the sensor assembly 100.

The sensor assembly 100, as shown in FIGS. 1-3 and 5-7, includes a housing 7, a pressure interface 72, a piezoelectric sensor 9, 10, a mechanical interface 1 and an electrical interface 12.

Figure 2:
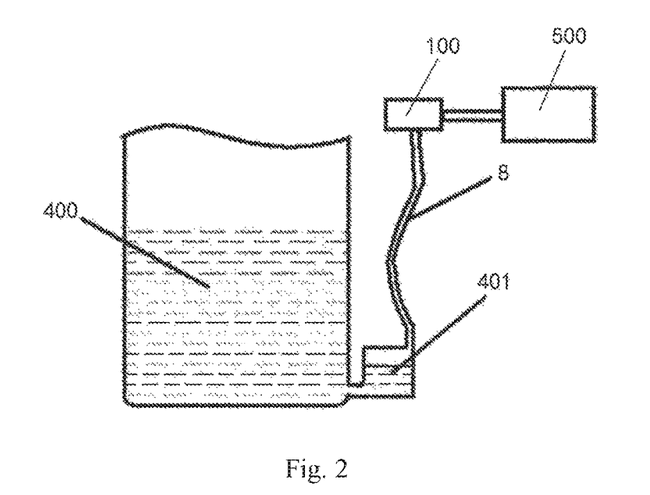
FIG. 2 is a side view of the liquid level detection device of FIG. 1 with a container and an external controller.
Figure 5:
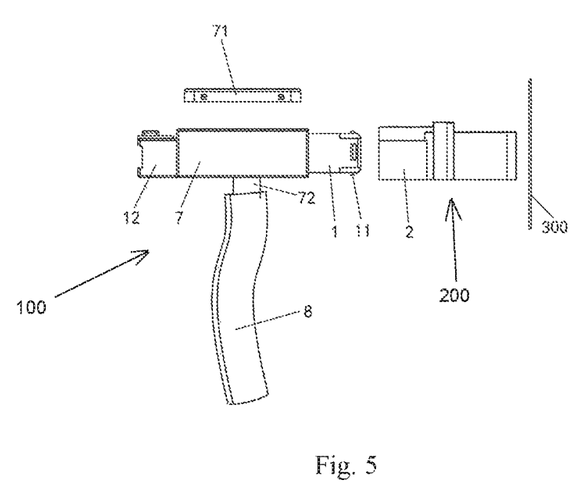
FIG. 5 is a side view of the liquid level detection device of FIG. 1.

The pressure interface 72, as shown in FIG. 5, is provided on the housing 7 and is connected to a flexible pressure transmission tube 8. As shown in FIG. 2, a first end of the pressure transmission tube 8 communicates with an air chamber 401 of a container 400 and an opposite second end of the pressure transmission tube 8 communicates with the pressure interface 72. A liquid level of a liquid, such as water, contained in the container 400 is converted to air pressure in the pressure transmission tube 8.

Figure 3:
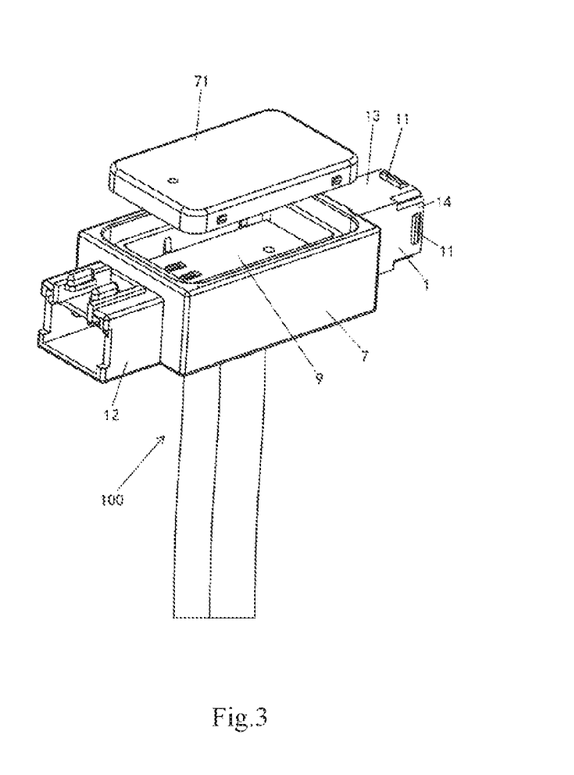
FIG. 3 is a perspective view of a sensor assembly of the liquid level detection device of FIG. 1.
Figure 6:
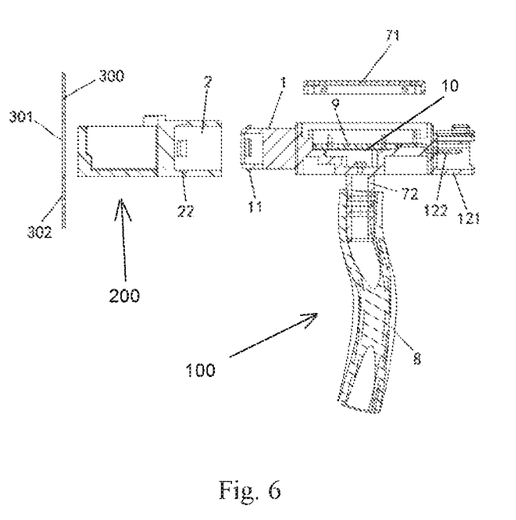
FIG. 6 is a sectional side view of the liquid level detection device of FIG. 1.

The piezoelectric sensor 9, 10, as shown in FIGS. 3 and 6, includes a printed circuit board (PCB) 9 and a semiconductor strain gauge 10 disposed on the PCB 9. The PCB 9 is disposed in the housing 7 and pressure from the pressure interface 72 acts on the PCB 9. The semiconductor strain gauge 10 outputs a resistance value varying with the air pressure inputted from the pressure interface 72. In an embodiment, the semiconductor strain gauge 10 is disposed at a position of the PCB 9 which has a maximum surface stress to improve sensitivity. A piezoresistor of the semiconductor strain gauge 10 is electrically connected to a bridge arm of a Wheatstone bridge. With liquid level variation in the container 400, the air pressure in the pressure transmission tube 8 varies, which results in variation in the resistance value of the piezoresistor; if an input voltage in the Wheatstone bridge remains unchanged, a specific value of the detected liquid level in the container 400 may be determined by measuring the output voltage variation. The use of the Wheatstone bridge improves measurement precision and reduces power dissipation to lower cost.

The housing 7, as shown in FIG. 3, has a cover 71 for covering the piezoelectric sensor 9, 10. The cover 71 seals the housing 7 to prevent dust and moisture from entering the housing 7 and contacting the piezoresistor on the PCB 9.

The mechanical interface 1, as shown in FIG. 3, is disposed at a first side of the housing 7. The mechanical interface 1 includes a plug portion 13 extending from the housing 7 and at least one engagement portion 11 disposed on the plug portion 13. In an embodiment, the engagement portions 11 are protrusions projecting from the plug portion 13. An end of the plug portion 13, as shown in FIG. 3, has a plurality of first cantilevers 14 separated from each other. The engagement portions 11 are disposed on the first cantilevers 14, respectively.

The electrical interface 12, as shown in FIGS. 3 and 6, is disposed at a second side of the housing 7 opposite to the first side. The electrical interface 12 includes a socket portion 121 and a plurality of connection terminals 122. The socket portion 121 extends from the second side of the housing 7 opposite to the mechanical interface 1. A first end of each connection terminal 122 extends through the housing 7 and is electrically connected to the PCB 9 of the piezoelectric sensor 9, 10, an opposite second end of each connection terminal is disposed in the socket portion 122.

Figure 7:
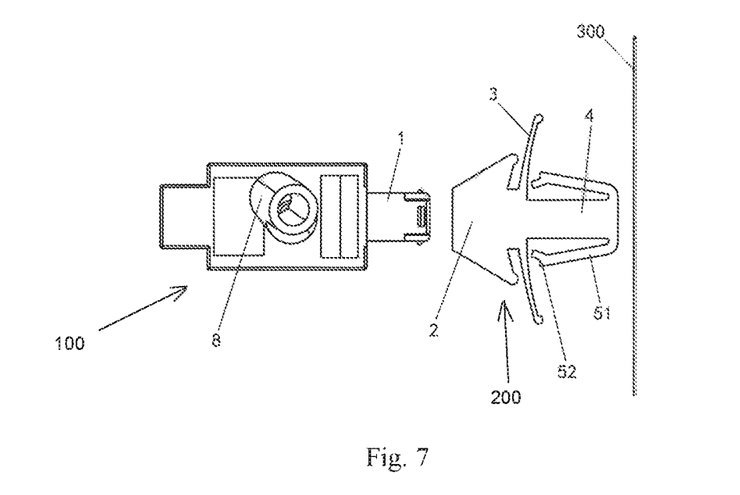
FIG. 7 is a bottom view of the liquid level detection device of FIG. 1.

The mounting mechanism 200, as shown in FIGS. 1 and 4-7, includes a mounting portion 3, 4, 5 and a mating interface 2. The mounting portion 3, 4, 5 includes at least one holder 3, an insertion portion 4, and at least one locking portion 5. Each locking portion 5, as shown in FIG. 7, includes a second cantilever 51 and a latch 52 disposed on an end of the second cantilever 51.

The mounting portion 3, 4, 5 of the mounting mechanism 200 is detachably mountable on a support frame 300, such as an inner wall of a washing machine, as shown in FIGS. 1 and 5-7.

Figure 1:
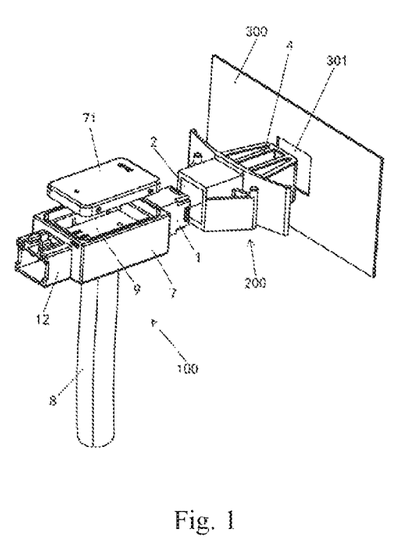
FIG. 1 is an exploded perspective view of a liquid level detection device according to the invention.
Figure 4:
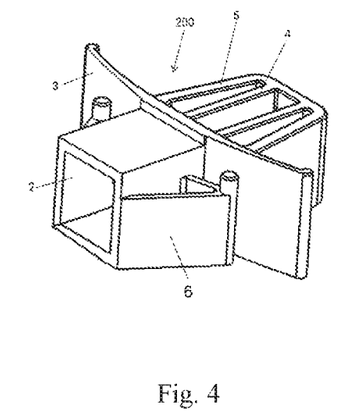
FIG. 4 is a perspective view of a mounting mechanism of the liquid level detection device of FIG. 1.

The insertion portion 4 extends through a mounting through hole 301 of the support frame 300 shown in FIG. 1. The holder 3 extends outwardly from the mating interface 2, and when the mounting mechanism 200 is mounted on the support frame 300, the holder 3 contacts a surface around the mounting through hole 301 of the support frame 300 at a front of the support frame 300 facing the sensor assembly 100. As shown in FIGS. 4 and 7, the holder 3 obliquely extends toward the support frame 300 with respect to the mating interface 2 and resiliently contacts the surface around the mounting through hole 301 of the support frame 300. That is, when the mounting mechanism 200 is mounted on the support frame 300, the holder 3 deforms resiliently so that the mounting mechanism 200 cannot shake relative to the support frame 300, improving the stability of the mounting mechanism 200. As shown in FIG. 4, the mating interface 2 has at least one support portion 6. When the mounting mechanism 200 is mounted on the support frame 300, the support portion 6 abuts against a front of the holder 3 to avoid excessive deformation of the holder 3.

The locking portion 5 is disposed on the insertion portion 4 and is elastically deformed to pass through the mounting through hole 301 of the support frame 300 together with the insertion portion 4. When elastically restored, at least one part of the locking portion 5 extends to an edge of the mounting through hole 301 on a back of the support frame 300 opposite the front. The second cantilever 51 obliquely extends toward the back of the support frame 300 from an end of the insertion portion 4 and the latch 52 abuts an edge of the mounting through hole 301 on the back of the support frame 300. The support frame 300 is held between the holder 3 and the latch 52. The locking portion 5 secures the insertion portion 4 within the mounting through hole 301 so that the mounting mechanism 200 is reliably mounted on the support frame 300. When the mounting mechanism 200 is mounted on the support frame 300, the locking portion 5 and part of the insertion portion 4 will be exposed from the back of the support frame 300, as shown in FIGS. 5 and 7.

To detach the mounting mechanism 200 from the support frame 300, a user presses the second cantilever 51 against the insertion portion 4 and extracts the insertion portion 4 from the mounting through hole 301.

The mechanical interface 1 of the sensor assembly 100 is detachably engageable with the mating interface 2 of the mounting mechanism 200 mounted to the support frame 300, as shown in FIGS. 1 and 5-7.

As shown in FIG. 6, the engagement portion 11 engages a mating engagement portion in the mating interface 2 when the mechanical interface 1 is engaged with the mounting mechanism 200 to prevent the mechanical interface 1 from being disengaged from the mounting mechanism 200. The mating interface 2 includes a socket portion in a snap-fit relationship with the plug portion 13 of the mechanical interface 1. The mating engagement portions of the mating interface 2 are formed as grooves 22 mating with the protrusions of the engagement portions 11. When the mechanical interface 1 is engaged with the mounting mechanism 200, the protrusion engages the groove, preventing the mechanical interface 1 from being disengaged from the mounting mechanism 200. During the engagement of the mechanical interface 1 with the mounting mechanism 200, the first cantilevers 14 contract inwardly due to contact with the mating interface 2, and when the engagement portions 11 projecting from the first cantilevers 14 are engaged with the mating engagement portions 22, the first cantilevers 14 return to their original shapes, thereby locking the mechanical interface 1 with the mounting mechanism 200. In an alternative embodiment, the engagement portions 11 are formed as grooves concaving from the plug portion 13, while the mating engagement portions are formed as protrusions projecting from the inner of the mating interface 2.

The electrical interface 12 of the sensor assembly 100, as shown in FIG. 2, is electrically connected to a mating electrical interface of an external controller 500 by plugging into the mating electrical interface. The second end of each connection terminal 122 is electrically connected with a mating connection terminal of the mating electrical interface inserted into the socket portion 122. The electrical signal generated by the piezoelectric sensor 9, 10 is transmitted to the external controller 500 and an operation of the container 400, for example, an operation of a washing machine, may be controlled according to the detected liquid level variation.

When it is necessary to maintain or replace the sensor assembly 100, the electrical interface 12 of the sensor assembly 100 is disengaged with the mating electrical interface of the external controller 500 and the sensor assembly 100 is directly pulled out from the mating interface 2 of the mounting mechanism 200. After finishing the maintenance and replacement, the sensor assembly 100 is mounted on the mounting mechanism 200 and the mating electrical interface of the external controller 500 is engaged to the electrical interface 12, thus facilitating the installation and detachment of the sensor assembly 100.

Although the above disclosure describes the liquid level detection device applied in a washing machine, the present disclosure is not limited to this embodiment; it should be appreciated that the liquid level detection device disclosed herein may be used in other devices requiring detection of a liquid level. The mounting mechanism 200 may also be detachably installed to other components requiring multiple instances of maintenance or replacement in order to install and fix the component.

What is claimed is:

1. A sensor assembly, comprising:
   a housing;
   a pressure interface disposed on the housing and communicating with a pressure transmission tube;
   a piezoelectric sensor disposed in the housing and configured to sense a pressure input at the pressure interface;
   a mechanical interface disposed directly on and extending laterally from a first side of the housing;
   an electrical interface disposed directly on and extending laterally from a second side of the housing opposite to the first side, the electrical interface including at least one connection terminal extending through the second side of the housing; and a mounting mechanism having a mounting portion detachably mountable on a support frame, and a mating interface disposed on the mounting portion and detachably engageable with the mechanical interface.

2. The sensor assembly of claim 1, wherein the electrical interface is electrically connected to a mating electrical interface of an external controller by plugging the electrical interface into the mating electrical interface.

3. The sensor assembly of claim 2, wherein the electrical interface further includes a socket portion contacting and extending from the second side of the housing, and wherein the at least one connection terminal comprises a plurality of connection terminals each having a first end extending through the second side of the housing and electrically connected to the piezoelectric sensor and an opposite second end disposed in the socket portion.

4. The sensor assembly of claim 3, wherein the second end of each connection terminal is electrically connected with a mating connection terminal of the mating electrical interface inserted into the socket portion.

5. The sensor assembly of claim 3, wherein the piezoelectric sensor has:
    a printed circuit board electrically connected with the connection terminals; and
    a semiconductor strain gauge disposed on the printed circuit board, the pressure input at the pressure interface acting on the printed circuit board at the semiconductor strain gauge and varying a resistance value of the semiconductor strain gauge.

6. The sensor assembly of claim 5, wherein the semiconductor strain gauge is electrically connected to a bridge arm of a Wheatstone bridge.

7. The sensor assembly of claim 1, wherein the mechanical interface has:
    a plug portion extending from the housing; and
    an engagement portion disposed on the plug portion and engaging the mounting mechanism.

8. The sensor assembly of claim 7, wherein an end of the plug portion has a plurality of first cantilevers separated from each other and one engagement portion is disposed on each of the first cantilevers.

9. The sensor assembly of claim 1, further comprising a cover disposed on the housing.

10. A liquid level detection device, comprising:
    a sensor assembly, having:
        (a) a housing having a sensor receiving passageway extending through a top surface thereof and into a sensor receiving space;
        (b) a pressure interface disposed on the housing and communicating with a pressure transmission tube;
        (c) a piezoelectric sensor disposed in the sensor receiving passageway and configured to sense a pressure input at the pressure interface;
        (d) a mechanical interface disposed directly on and extending laterally from a first side of the housing;
        (e) an electrical interface disposed directly on and extending laterally from a second side of the housing opposite to the first side; and
        (f) a cover positioned over the sensor receiving space and sealing the sensor receiving passageway; and
    a mounting mechanism, having:
        (a) a mounting portion detachably mounted on a support frame; and
        (b) a mating interface disposed on the mounting portion and detachably engageable with the mechanical interface.

11. The liquid level detection device of claim 10, wherein the electrical interface is electrically connected to a mating electrical interface of an external controller by plugging the electrical interface into the mating electrical interface.

12. The liquid level detection device of claim 10, further comprising a pressure transmitting tube having a first end communicating with a container receiving a liquid and an opposite second end communicating with the pressure interface, a pressure in the pressure transmission tube varying with a liquid level of the liquid in the container.

13. The liquid level detection device of claim 10, wherein the mechanical interface has:
    a plug portion contacting and extending laterally from the first side of the housing and inserted into the mating interface; and
    an engagement portion disposed on the plug portion and engaging a mating engagement portion disposed in the mating interface.

14. The liquid level detection device of claim 13, wherein the engagement portion is a protrusion and the mating engagement portion is a groove receiving the protrusion.

15. The liquid level detection device of claim 10, wherein the mounting portion has:
    an insertion portion extending through a mounting through hole of the support frame;
    a holder extending outwardly from the mating interface and contacting a front surface of the support frame around the mounting through hole; and
    a locking portion disposed on the insertion portion.

16. The liquid level detection device of claim 15, wherein the locking portion has:
    a second cantilever obliquely extending toward the support frame from an end of the insertion portion; and
    a latch disposed on the second cantilever.

17. The liquid level detection device of claim 16, wherein the second cantilever is elastically deformed to pass through the mounting through hole with the insertion portion and, when elastically restored, the latch abuts an edge of the mounting through hole on a back surface of the support frame such that the support frame is held between the holder and the latch.

18. The liquid level detection device of claim 15, wherein the holder extends obliquely toward the front surface of the support frame and is in resilient contact with the front surface of the support frame.

19. The liquid level detection device of claim 18, wherein the mating interface has a support portion abutting the holder and preventing excessive deformation of the holder.

20. A liquid level detection device, comprising:
    a sensor assembly, having:
        (a) a housing having a sensor receiving passageway extending through a top surface thereof and into a sensor receiving space;
        (b) a pressure interface disposed on the housing and communicating with a pressure transmission tube;
        (c) a piezoelectric sensor disposed in the sensor receiving passageway and configured to sense a pressure input at the pressure interface;
        (d) a mechanical interface disposed at a first side of the housing and having a plug portion extending from the housing and inserted into the mating interface, and an engagement portion disposed on the plug portion and engaging a mating engagement portion disposed in the mating interface, wherein an end of the plug portion has a plurality of first cantilevers separated from each other and one engagement portion is disposed on each of the first cantilevers;

(e) an electrical interface disposed at a second side of the housing opposite to the first side; and (f) a cover positioned over the sensor receiving space and sealing the sensor receiving passageway; and a mounting mechanism, having:

(a) a mounting portion detachably mounted on a support frame; and (b) a mating interface disposed on the mounting portion and detachably engageable with the mechanical interface.

* * * * *